July 24, 1923.

J. R. WINTER

MEANS FOR SECURING REMOVABLE RIMS

Filed Jan. 10, 1921

1,462,529

Patented July 24, 1923.

1,462,529

UNITED STATES PATENT OFFICE.

JOHN R. WINTER, OF LANSING, MICHIGAN.

MEANS FOR SECURING REMOVABLE RIMS.

Application filed January 10, 1921. Serial No. 436,111.

*To all whom it may concern:*

Be it known that I, JOHN R. WINTER, a citizen of the United States, residing at Lansing, in the county of Ingham and State of Michigan, have invented a new and useful Improvement in Means for Securing Removable Rims, of which the following is a specification.

My invention relates to means for securing removable rims to automobile wheels and its purpose is to make a device that shall be more beautiful in appearance and more effective in operation.

Figure 1:
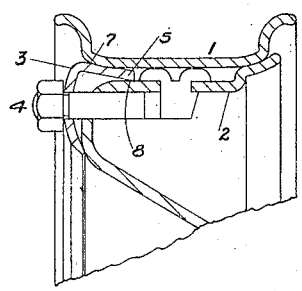
Figure 3:
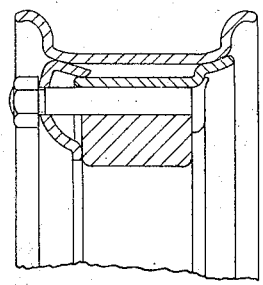
Figure 2:
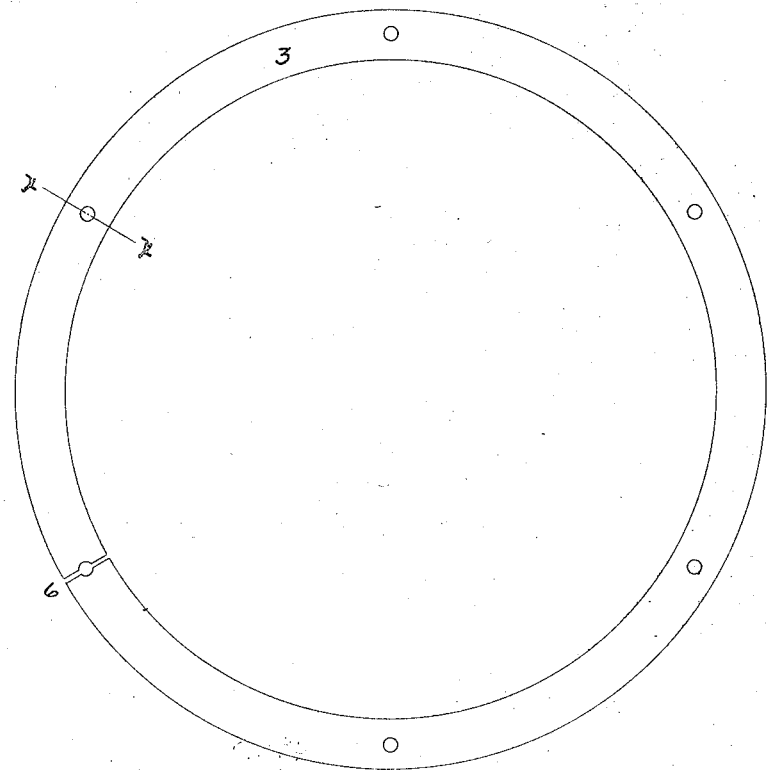

I attain these purposes by the means shown in the accompanying drawings in which Fig. 1 is a cross-section of an automobile rim taken on the line $x-x$ of Fig. 2. Fig. 2 is an elevation of my improved ring. Fig. 3 is a cross-section of a modified form of my improved rim locking ring adapted for use with wooden fellies.

Referring more particularly to the drawings, 1 is a section of a removable automobile rim which may be of any approved design. 2 is the metallic rim or felly band of the wheel. I have shown this in the form employed in one of my improved disk wheels which is covered by my application filed September 11, 1920, Serial No. 409,668 but any approved design of felly or felly band may be employed since these form no part of my invention. 3 is my improved rim locking ring which is held in place by bolts 4. The locking ring 3 is formed of one continuous piece of metal which may either be entire or divided as shown at 6 in Fig. 2. In that case I prefer to make the joint at one of the bolt holes as shown in Fig. 2. As shown in the drawings, my improved ring is formed of two members, the upper member 5 extending inwardly and being bent at such an angle that its upper surface contacts with the rim substantially at or near the angle 7 and its lower surface or extremity 8 with the upper surface of the felly band. The other member extends radially and its inner extremity contacts with the disk as shown in Fig. 1 when used with a disk wheel or with the felly as shown in Fig. 3 when used with a wooden felly. The only difference in the construction of my improved locking ring when used with a wooden felly is that the inner edge of the ring is turned as shown at 9 so as to prevent a slightly flattened surface against the felly. It will be noted that there is an open space between the two contact points which gives a measure of elasticity to the action of the ring and avoids danger of loosening by jars.

Subject matter disclosed in this application but not claimed is claimed in my copending application Serial No. 436,110 filed January 10, 1921.

The operation is self evident from the drawings and needs no further explanation.

I claim as my invention and desire to secure by Letters Patent:

1. In a device of the character described, a locking ring adapted to extend circumferentially of the wheel and provided with an inwardly extending flange adapted to contact at its outer surface with the rim of the wheel and at its inner with the felly, a part of the flange extending outwardly of the felly in spaced relation therewith, and the inner edge portion of said ring being adapted to contact with the felly.

2. In a device of the character described, a locking ring adapted to extend circumferentially of the wheel and provided with an inwardly extending flange adapted to contact at its outer surface with the rim of the wheel and at its inner with the felly, a part of said flange extending outwardly of the felly in spaced relation therewith, and the inner edge portion of said ring being adapted to contact with the felly, and means for retaining said ring in position.

3. In a device of the character described, a locking ring adapted to extend circumferentially of the wheel and provided with an inwardly extending flange adapted to contact at its outer surface with the rim of the wheel and at the extremity of its inner surface with the felly, a part of said flange extending outwardly of the felly in spaced relation therewith, and the inner edge portion of said ring being adapted to contact with the felly, and means for retaining said ring in position.

4. In a device of the character described, a locking ring adapted to extend circumferentially of the wheel and provided with an inwardly extending flange adapted to contact at its outer surface with the rim of the wheel and at the extremity of its inner surface with the felly, a part of said flange extending outwardly of the felly in spaced relation therewith, and the inner edge portion of said ring being adapted to contact with the felly, and means for retaining said ring in position, said flange being so shaped as to act as a retaining wedge and support for said rim.

5. In a device of the character described, a locking ring adapted to extend circumferentially of the wheel and provided with an inwardly extending flange adapted to contact at its outer surface with the rim of the wheel and at the extremity of its inner surface with the felly, the inner edge of said ring being adapted to contact with the felly, and means for retaining said ring in position, said flange being so shaped as to act as a retaining wedge and support for said rim, said ring and flange being so bent as to leave an open space between said ring and said felly.

6. In a device of the character described, a locking ring member adapted to extend circumferentially of the wheel and provided with an inwardly extending flange adapted to contact at its outer portion with the rim of the wheel and at its inner portion with the felly, a part of said flange extending outwardly of the felly in spaced relation therewith, and the inner edge portion of the ring being adapted to contact with the felly, a part of the ring extending in spaced relation with the felly.

7. In a device of the character described, a locking member including a radially extending part and an inwardly extending flange, the flange being adapted to contact at its outer portion with the rim of the wheel and at its inner portion with the felly, a part of the flange extending outwardly of the felly in spaced relation therewith, and the inner edge portion of said radial part being adapted to contact with the felly.

JOHN R. WINTER.

Witnesses:
 C. M. RULE,
 C. E. HOM.